(12) United States Patent
Keller et al.

(10) Patent No.: US 10,635,172 B1
(45) Date of Patent: Apr. 28, 2020

(54) BEND ANGLE SENSING MECHANISM FOR WEARABLE DEVICE

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US); Ke-Yu Chen, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/724,470

(22) Filed: Oct. 4, 2017

Related U.S. Application Data

(60) Provisional application No. 62/403,973, filed on Oct. 4, 2016.

(51) Int. Cl.
*G06F 3/01* (2006.01)
*G01B 7/004* (2006.01)
*G06F 3/0346* (2013.01)

(52) U.S. Cl.
CPC ............. *G06F 3/014* (2013.01); *G01B 7/004* (2013.01); *G06F 3/017* (2013.01); *G06F 3/0346* (2013.01)

(58) Field of Classification Search
CPC ........ G06F 3/014; G06F 3/017; G06F 3/0346; G01B 7/004
See application file for complete search history.

(56) References Cited

U.S. PATENT DOCUMENTS

| 6,104,379 | A | * | 8/2000 | Petrich | G06F 3/014 345/156 |
| 2003/0234823 | A1 | * | 12/2003 | Sato | G06F 3/013 715/848 |
| 2004/0174337 | A1 | * | 9/2004 | Kubota | G06F 3/014 345/156 |
| 2013/0057256 | A1 | * | 3/2013 | Ernst | G01R 33/0005 324/202 |
| 2013/0245992 | A1 | * | 9/2013 | Servel | G01D 5/145 702/150 |
| 2017/0090568 | A1 | * | 3/2017 | Chen | G06F 3/014 |

* cited by examiner

*Primary Examiner* — Dmitriy Bolotin
(74) *Attorney, Agent, or Firm* — Fenwick & West LLP

(57) ABSTRACT

A wearable device to be worn on a body part includes a magnetic field generator, a magnetic field sensor, and a controller. The controller instructs the magnetic field generator to generate a magnetic field, instructs magnetic field sensor to measure a sensor signal, and to determine a position of the body part based on the measured sensor signal. The magnetic field sensor can include multiple sensor elements with known or solved positions relative to one another. The wearable device can be a glove. The controller may determine a bend angle of a finger or an angle between two fingers.

20 Claims, 10 Drawing Sheets

600

Responsive to applied magnetic field(s)

Measure sensor signals corresponding to one or more sensor-generator pairs located on a wearable device
610

↓

Determine spatial vectors representing relative positions and/or orientations for each sensor-generator pair based on the measured sensor signals
620

↓

Determine relative orientations of portions of the wearable device (e.g., bend angle of joint or angular separation between fingers) based on the spatial vectors
630

FIG. 6

BEND ANGLE SENSING MECHANISM FOR WEARABLE DEVICE

CROSS REFERENCE TO RELATED APPLICATION

This application claims the benefit of U.S. Provisional Application No. 62/403,973 filed Oct. 4, 2016, which is incorporated by reference in its entirety.

BACKGROUND

The present disclosure generally relates to a wearable device for use in a virtual, augmented, or mixed reality (VR, AR, or MR) system, and more specifically relates to determining positions of a body part that the wearable device is worn on.

VR is a simulated environment created by computer technology and presented to a user, such as through a system. Similarly, AR or MR combine a computer-simulated environment with reality for presentation to a use through an AR/MR system. Typically, a VR/AR/MR system includes a headset that provides visual and audio information to the user. However, when wearing the headset, the user is unable to see the user's hands or interact with the simulated environment presented by the headset with the user's hands. Conventional systems create virtual hands in the simulated environment and use a hand tracking system to track motion and positions of the user's hands. However conventional hand tracking systems are often unable to accurately track positions of the user's fingers and thumbs, and thus are unable to track the precise movements of the user's digits and hand through space and time, causing poor representation of movement of the user's hand by virtual hands of the user within the simulated environment.

SUMMARY

A wearable device (such as a glove or other control adapted to be worn on a portion of a body) includes a sensing apparatus that determines spatial orientation and/positions of points on the wearable device based on magnetic fields, constant or time varying, emitted by magnetic field generators and detected by an array of magnetic flux sensors. In some embodiments, the sensors of the array have known or solved positions relative to one another. In some embodiments, the wearable device comprises an array of generators having relative position and orientation tracked by an array of sensors; alternatively, the wearable device comprises an array of sensors determining their own position and orientation relative to an array of generators. In some embodiments, magnetic flux propagates from generator to sensor through the ambient environment, while in some embodiments a controlled medium with controlled permeability defining the coupling path is used.

In some embodiments, a glove (or other control adapted to be worn on a portion of a body) includes a sensing assembly for sensing a bend angle, such as the bend angle of a finger or finger component, or an angle between two fingers. In some embodiments, the sensing assembly includes one or more Hall effect sensors, ferromagnetic lensing sensors, force sensors, and the like.

In some embodiments, one or more magnetic flux sensors coupled to a known position relative to a feature on a first finger and one or more magnetic generators coupled to a known position relative to a feature on a second finger can be used to determine a lateral angular (e.g., planar) separation between the first finger and the second finger. In some embodiments, one or more magnetic flux sensors positioned at a first finger and one or more magnetic generators coupled to a second finger can be used to determine a transverse angular (e.g., oblique) separation between the first finger and the second finger, in accordance with one or more embodiments. In some embodiments, one or more magnetic flux sensors and one or more magnetic field generators are positioned along a length of a finger, configured to determine bend angles of the finger. Additionally, the one or more magnetic flux sensors and the one or more magnetic field generators can be used to calibrate or condition data from another sensor which would be used to do the actual sensing. For example, a strain gauge positioned between two fingers could have its strain response mapped to positioned determined by the magnetic sensor pair, or an incremental encoder could use the magnetic data for indexing.

In some embodiments, the orientations and positions of points on the wearable device (such as a glove) worn around a body part (e.g., fingers of a hand) are used to determine a state or pose of the body part. For example, the orientations/positions of points on a glove (or other wearable device) are used to provide information about or to render a state of the hand (or other body part) in a VR (virtual reality) environment or VR world. For example, states of a hand (e.g., open, closed, pointing, gesturing, etc.) can be determined based on the bend angles of fingers or finger tips corresponding to the positions or orientations of points on the glove.

In one or more embodiments, a wearable device includes one or more magnetic field generators coupled to the wearable device, a corresponding one or more magnetic field sensors coupled to the wearable device, and a controller. The wearable device is configured to be worn on a body part of a user. The controller instructs each magnetic field generator to generate a magnetic field, instructs each corresponding magnetic field sensor to measure one or more sensor signals, and determines spatial vectors representing relative position for each magnetic field generator and corresponding magnetic field sensor based on the one or more sensor signals. At least one magnetic field sensor may have a plurality of sensing elements with known or solved positions relative to one another. The wearable device may be a glove. In one aspect, a magnetic field generator may be coupled to a known position on a first finger and a corresponding magnetic field sensor may be coupled to a known position on a second finger, and the controller determines a lateral angular separation between the first finger and the second finger based on the spatial vectors. In another aspect, a magnetic field generator is coupled to a first known position on a finger and a corresponding magnetic field sensor is coupled to a second known position on the finger, and the controller is further configured to determine a bend angle of the finger based on the spatial vectors.

DESCRIPTION OF THE DRAWINGS

FIG. 6 is a flow chart for an example process for operating the orientation sensing system on a wearable device based on magnetic fields, according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIGS. 1A-1E illustrate mathematical frameworks within which spatial positions between magnetic sensors (MS) and magnetic field generators (MG) are determined, in accordance with one or more embodiments. Note, in alternate embodiments, other mathematical models may be used (e.g., a triangulation model).

Figure 1B:
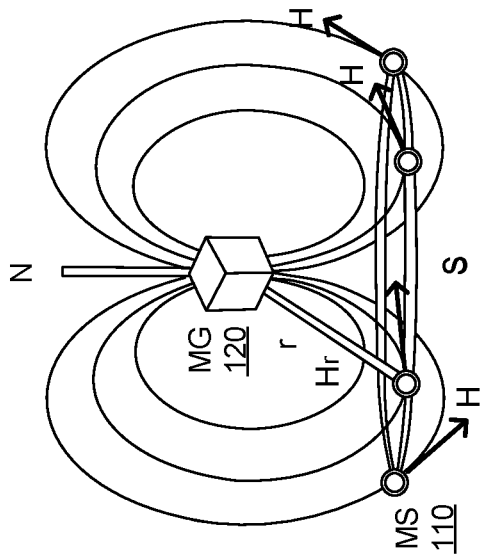
FIG. 1B illustrates a problem for calculation of spatial relationships between magnetic generators and magnetic flux sensors in a 2D magnetic field space, in accordance with one or more embodiments.
Figure 1C:
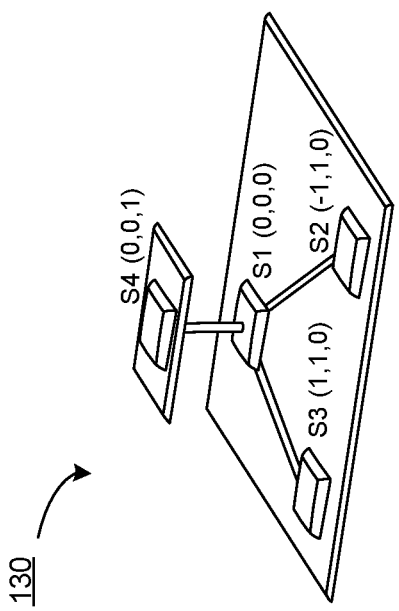
FIG. 1C illustrates a magnetic flux sensor including four constituent sensing elements, in accordance with one or more embodiments.
Figure 1A:
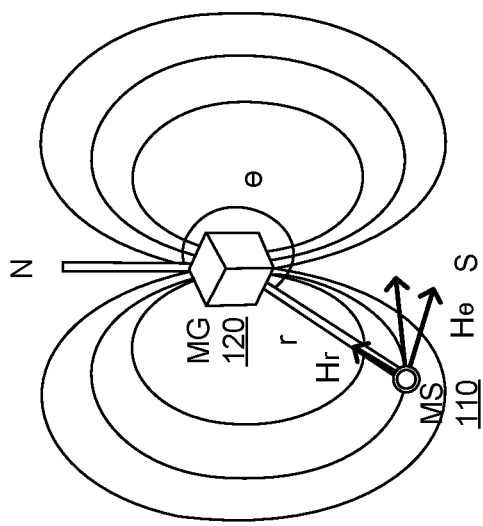
FIG. 1A illustrates a framework in a 2D magnetic field space for calculation of spatial relationships between magnetic generators and magnetic flux sensors, in accordance with one or more embodiments.

FIGS. 1A-1B illustrate a framework in a 2D magnetic field space for calculation of spatial relationships between magnetic generators and magnetic flux sensors.

In one or more embodiments, each magnetic field generator (MG 120) includes one or more magnets; each magnet of a given magnetic generator (MG 120) may be configured to generate a corresponding magnetic field oriented along a distinct direction (e.g., a distinct coordinate axis) from other magnets of that magnetic generator. In some embodiments, a magnetic field generator (MG 120) comprises one or more programmable magnets (e.g., a polymagnet) that provide programmable (e.g., software-controlled) magnetic field properties. These programmable magnets enable control over and programmable variability of a number of magnetic poles, a density of magnetic poles (number of magnetic poles over a given surface area), a spatial orientation/configuration/layout of magnetic poles, magnetic field strength, a variation of magnetic field strength as a function of spatial coordinates (e.g., distance from the MG), focal points of the magnetic field, mechanical forces (e.g., attraction, repulsion, holding, alignment forces) between poles of the same polymagnet or between polymagnets, and so on. In alternate embodiments, an electromagnet may be used to allow for a controlled magnetic field. Arrays of electromagnets or ones with multiple windings may be used to control the field geometry.

Similarly, in one or more embodiments, each magnetic flux sensor (MS 110) includes one or more constituent sensing elements (e.g., one or more magnetometers S1-S4). In some embodiments, each sensing element (magnetometer) is placed at a distinct known location with respect to other sensing elements within the magnetic flux sensor (MS 110), as illustrated in and explained with respect to FIG. 1C. Alternatively, or in addition, each sensing element (magnetometer) is configured to measure a signal responsive to a detected magnetic field that is oriented along a distinct direction (e.g., a distinct coordinate axis) or range of directions. Similarly, magnetic flux sensors may be used to measure the amplitude of magnetic flux signals with a given modulation or at a given range of frequencies.

For an arbitrary location in the space, the strength of magnetic field H is proportional to two factors r (the distance between the sensing point to the magnet) and θ (the angle between the magnet's north and the sensor). In magnetism, H is usually decomposed to two orthogonal vectors (e.g., in radial space) $H_r$ and $H_\theta$. These two vectors are the basis in this 2D magnetic-field space and can be mathematically represented in terms of r and θ (as shown in FIG. 1A).

$$H_r = M \cos \theta / 2\pi r^3 \qquad (1)$$

$$H_\theta = M \sin \theta / 4\pi r^3 \quad (2)$$

where M is magnetic moment. In the case of an electromagnet, the value of M related to the permeability of core material, current and area of the electromagnet. Given a constant AC current, we can assume M is a constant.

In one or more embodiments, to apply trilateration for spatial position estimation, the first step is to calculate the distance between the electromagnet and the sensors. Solving equations (1) and (2), the distance (r) and orientation ($\theta$) can be calculated from the magnetic field ($H_r$ and $H_\theta$). However, there exists spatial ambiguity in the 3D space (as illustrated in FIG. 1B)—from a top view of the magnet, points located on a circle concentric with the axis of the magnet have the same field strength as they are all located at the same distance and angle from the magnet. With unknown sensor orientations, a sensor detects the same sensor measurement on these concentric positions, resulting in spatial ambiguity.

According to one or more embodiments, to resolve the spatial ambiguity, the total magnetic field strength is calculated based on equation (3):

$$\|H\|^2 = (H_r)^2 + (H_\theta)^2 = K^* r^{-6} * (3\cos^2\theta + 1) \quad (3)$$

where $\|H\|$ is the norm-2 of the sensor vector, r and $\theta$ are the distance between sensors and electromagnet (same as in Eq. 1 and 2), and K is a constant. The constant K is a function of constant M (e.g., $K = M^2/16\pi^2$). The constant K can be leveraged to redesign the electromagnets. Equation (3) comprises the two variables r and $\theta$ to be solved for.

In other words, the physical meaning behind this framework is to convert the 3D space into a "beacon system" in which the received signal strength (i.e., $\|H\|$, the total magnetic field strength) relates to the distance from the signal source (i.e., r) and signal receiving angle (i.e., $\theta$). The 1D projection can eliminate the need for searching unknown rotation angles of the magnet and can significantly reduce the system complexity.

Equation 3 however is still under-constrained due to the two variables (r, $\theta$) to be solved for, from a single equation (e.g., from $\|H\|$). Hence the next step is to remodel these two variables and convert the system into an over-constrained system.

To this end, a fixed and/or known sensor layout is used to define a coordinate system (e.g., as illustrated in FIG. 1C). In one or more embodiments, and in the coordinate system 130 of FIG. 1C, sensing element (sensor) S1 is used as the origin and the coordinates of the other three sensing elements (sensors) S2, S3, S4 can be ascertained with respect to the coordinates of S1. For instance, in the illustration of FIG. 1C, sensing elements S1, S2 and S3 are coplanar while S4 is positioned above S1 along a direction orthogonal to the plane in which S1, S2 and S3 are positioned.

FIG. 1C illustrates a coordinate system 130 system for trilateration and determination of spatial positions of magnetic generators and flux sensors, according to one or more embodiments. In some embodiments, the coordinate system 130 of FIG. 1C, illustrates a single magnetic flux sensor (MS) which includes a plurality of constituent sensing elements (e.g., magnetometers S1, S2, S3, and S4). Alternatively, each magnetometer (e.g., magnetometers S1, S2, S3, and S4) of the coordinate system 130 may correspond to a distinct magnetic flux sensor (MS).

The two variables (r, $\theta$) of equations (1)-(3) are replaced with the electromagnet's 3D position (x, y, z) in the coordinate system of FIG. 1C. In other words, given this coordinate system 130, two variables (r, $\theta$) can be represented in terms of the electromagnet's 3D positions (x, y, z) using equations (4) and (5):

$$r_1 = (x^2 + y^2 + z^2)^{1/2} \quad (4)$$

$$\cos \theta_1 = z/r_1 \quad (5)$$

Similarly, these three shared variables (x, y, z) can be substituted into the equation (3) for the other three sensors, resulting in equations (6)-(11):

$$r_2 = ((x+1)^2 + (y-1)^2 + z^2)^{1/2} \quad (6)$$

$$\cos \theta_2 = z/r_2 \quad (7)$$

$$r_3 = ((x-1)^2 + (y-1)^2 + z^2)^{1/2} \quad (8)$$

$$\cos \theta_3 = z/r_3 \quad (9)$$

$$r_4 = (x^2 + y^2 + (z-1)^2)^{1/2} \quad (10)$$

$$\cos \theta_4 = z/r_4 \quad (11)$$

The above resulting system of equations is over-constrained and has four equations (of Eq. 3) from each of four sensors to be solved for three shared variables (x, y, z).

In some embodiments, where the magnetic field generator (MG) comprises a programmable magnet (e.g., a polymagnet) or electromagnet, magnetic field properties of the MG are programmable, controllable, and/or reconfigurable. In some embodiments, the programmable, controllable, and/or reconfigurable magnetic field properties include a number of magnetic poles, a density of magnetic poles (e.g., number and distribution of magnetic poles over a given surface area of the MG), a spatial orientation/configuration/layout of magnetic poles, magnetic field strength, a variation of magnetic field strength as a function of spatial coordinates (e.g., distance from the MG), focal points of the magnetic field, mechanical forces (e.g., attraction, repulsion, holding, alignment forces) between poles of the same polymagnet or between polymagnets, and so on. For example, a spatial flux density or flux orientation mapping can be programmed or configured (e.g., to be distinct from the spatial flux density relationship described in equations (1) and (2)) to uniquely or distinctly encode position and/or orientation of different magnets and/or different sensors. In some embodiments, polymagnets and programmable magnetic sensors could be programmed to provide stronger magnetic fields, or fields concentrated within shorter ranges to improve resolution and accuracy of position sensing within the shorter sensing ranges.

In some embodiments, when the magnetic field generator (MG) is a programmable magnet or an electromagnet, the signals applied to the magnetic field generator to generate the magnetic field (e.g., frequency or time division multiplexed signals) are optionally pre-processed or normalized by a function of $1/r^3$ corresponding to the effect of spatial distance on the magnetic field components in radial coordinate space. For example, a "non-affine" transformation may be applied to the signals applied to the magnetic field generator to transform the input signals based on a normalization function corresponding to $1/(r^3)$ in radial coordinate (r, $\theta$) space.

Figure 1E:
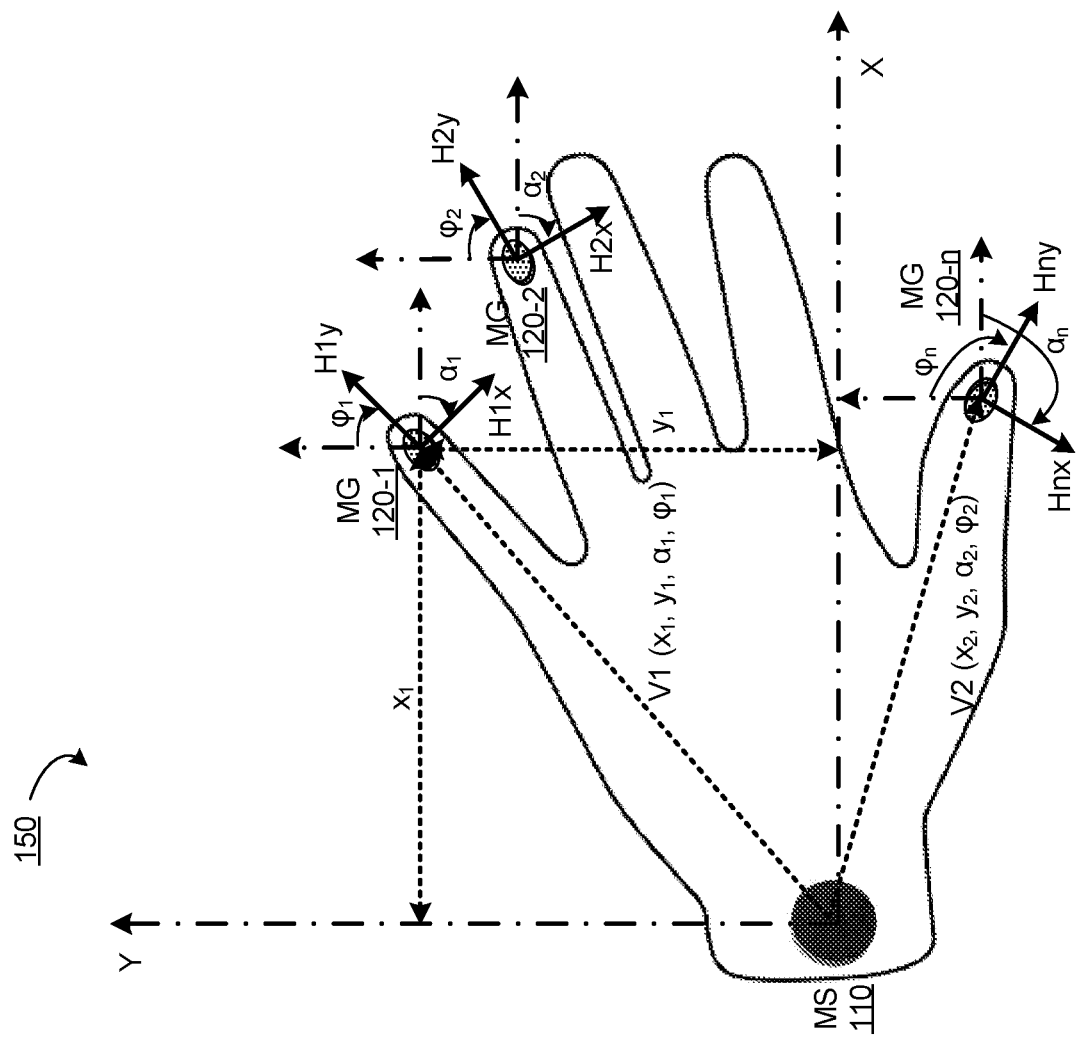
FIG. 1E illustrates a 2D framework for determining spatial position vectors in 2D Cartesian space for a configuration with a single magnetic flux sensor and a multiple magnetic generator, in accordance with one or more embodiments.
Figure 1D:
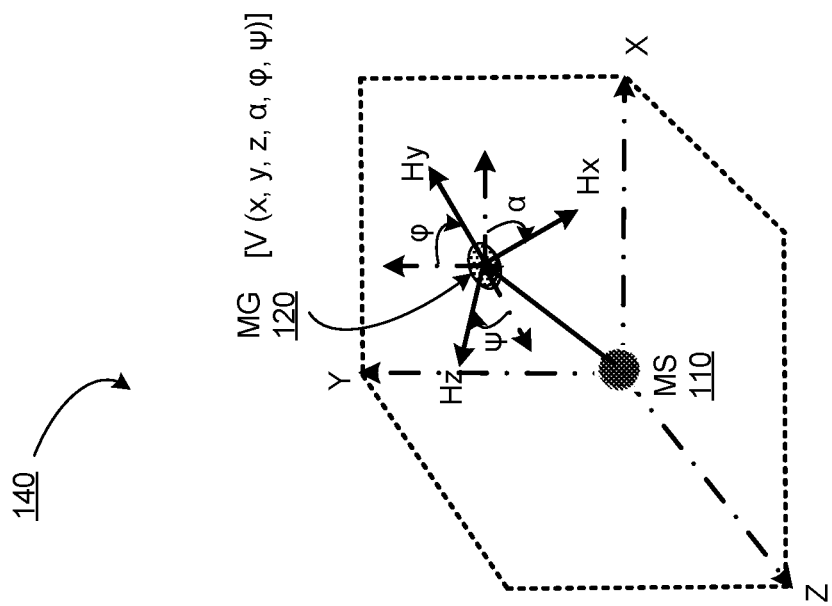
FIG. 1D illustrates a 3D framework for determining spatial position vectors in 3D Cartesian space for a configuration with a single magnetic flux sensor and a single magnetic generator, in accordance with one or more embodiments.

FIG. 1D illustrates an alternative 3-dimensional framework 140 for determining spatial position vectors in 3D Cartesian space for a configuration with a single magnetic flux sensor MS 110 and single magnetic generator MG 120.

In one or embodiments, a spatial position is expressed as a vector with multiple components representing spatial coordinates (positions and/or orientations) in a multi-dimensional space. For example, in a three dimensional coordinate system, the vector components of a spatial position vector include Cartesian distances along three orthogonal Cartesian coordinate axes (X, Y, Z) and/or angular orientation (angles α, φ, ψ) defined with respect to three mutually perpendicular Cartesian axes (X, Y, Z) or mutually perpendicular Cartesian planes (YZ, XZ, and XY). In some embodiments, the spatial position vectors may include Cartesian distances along three orthogonal Cartesian coordinate axes (X, Y, Z), but not the angular orientations (angles α, φ, ψ).

In one or more embodiments, each magnetic field generator (MG) includes one or more magnets; each magnet of a given magnetic generator (MG) may be configured to generate a corresponding magnetic field oriented along a distinct direction (e.g., a distinct coordinate axis) from other magnets of that magnetic generator. In some embodiments, a magnetic field generator includes three magnets, the three magnets generating three orthogonal magnetic fields along three orthogonal Cartesian coordinate axes (Hx, Hy, and Hz, as illustrated for MG 120 in FIG. 1D).

Similarly, each magnetic flux sensor (MS) includes one or more constituent sensing elements (e.g., one or more magnetometers), each sensing element (magnetometer) configured to generate a signal responsive to a detected magnetic field that is oriented along a distinct direction (e.g., a distinct coordinate axis). For example, a magnetic flux sensor (e.g., MS 110 of FIG. 1D) includes three sensing elements (such as hall-effect sensors) configured to generate (output) corresponding signals (e.g., current outputs) that are proportional to and responsive to magnetic fields along the three different orthogonal axes (X, Y, and Z) of a three-dimensional spatial coordinate system.

In such embodiments, a spatial position vector (e.g., vector V, as illustrated in FIG. 1D) may be defined for each MG-MS pair, to represent Cartesian distances along three orthogonal Cartesian coordinate axes (X, Y, Z) between the MG and MS. The spatial position vector may also include angular orientations represented as angles (α, φ, ψ) between the magnetic field axes of the MG (e.g., Hx, Hy, and Hz) and the sensing axes of the MS (e.g., X, Y, and Z). The angles may alternatively be computed with respect to the three mutually perpendicular Cartesian planes (YZ, XZ, and XY) that are defined either for the MS or the MG.

FIG. 1E illustrates a 2-dimensional framework 150 for determining spatial position vectors in 2D Cartesian space for a configuration with a single magnetic flux sensor MS 110 and multiple magnetic generators (including MG 120-1, 120-2, and 120-n).

In some embodiments, the magnetic fields (H1x, H1y; H2x, H2y; Hnx, Hny) from the different magnetic generators (MG 120-1, 120-2, 120-n, and so on) are uniquely distinguished in order for the magnetic flux sensor (MS 110) to be able to discriminate signals from each of the magnetic generators MG 120-1, 120-2, 120-n, in order to separately determine positions of these magnetic generators MG 120-1, 120-2, 120-n. For example, the magnetic fields generated by each of the MG can be distinguished from magnetic fields generated by other MGs by controlling one or more of the AC characteristics of the field. For example, each MG can be driven at a different frequency (e.g., frequency division multiplexing) for disambiguation from other electromagnets. Alternatively, each MG can be driven at a different instance in time (e.g., time division multiplexing) for disambiguation from (and interoperability with) other MGs or undesired interference in the form of ambient or external magnetic flux.

In some embodiments, a magnetic field generator includes one or more electromagnets that can be independently driven to result in the creation of a three-dimensional magnetic field with known AC characteristics and geometry.

In such embodiments, the magnetic fields generated by each of the electromagnets can be distinguished from magnetic fields generated by other electromagnets by controlling one or more of the AC characteristics of the field. For example, each electromagnet can be driven at a different frequency (e.g., frequency division multiplexing) for disambiguation from other electromagnets. Alternatively, each electromagnet can be driven at a different instance in time (e.g., time division multiplexing) for disambiguation from (and interoperability with) other electromagnets or undesired interference in the form of ambient or external magnetic flux.

As illustrated in FIG. 1E for the first magnetic field generator MG 120-1 with reference to the magnetic flux sensor MS 110, a spatial position vector (V1) including the Cartesian distances ($x_1$, $y_1$) and angular orientations ($α_1$, $φ_1$), can be computed based on the signals detected by the MS 110 responsive to the magnetic fields (H1x and H2x) generated by MG 120-1.

Similarly, as illustrated in FIG. 1D, a spatial position vector (V) including the Cartesian distances (x, y, z) and angular orientations (α, φ, ψ), can be computed based on the signals detected by a MS 110 responsive to the magnetic fields (Hx, Hy, and Hz) generated by MG 120, in a 3D Cartesian space.

In some embodiments, in a 3D coordinate system, the spatial ambiguity in positions in the 3D sensor space (explained with reference to FIGS. 1A-1B) is resolved by performing 2D projections from the 3D space to a 2D magnetic field space. This 2D projection involves three unknown rotation angles and can be mathematically indicated as below:

$$T_{R,P,Y}H = T_{R,P,Y}\begin{pmatrix} H_x \\ H_y \\ H_z \end{pmatrix} = \begin{pmatrix} H_r \\ H_\theta \\ 0 \end{pmatrix} = \begin{pmatrix} M\cos\theta/2\pi r^3 \\ M\sin\theta/4\pi r^3 \\ 0 \end{pmatrix} \quad (12)$$

where H is the sensor vector and $T_{R,P,Y}$ is a rotation matrix with three unknown variables R (Roll), P (Pitch) and Y (Yaw) corresponding to angular orientations (α, φ, ψ), to project the 3D sensor space to the 2D magnetic-field space. Since equation (12) is an under-constrained system; the system needs to be solved for five unknown variables (R, P, Y, r, θ) from three equations ($H_x$, $H_y$, $H_z$). These unknown angles (e.g., R, P, Y) are solved, in some embodiments, using a searching process (e.g., gradient descent) that determines a global optimal solution.

Determination of Lateral (e.g., Planar) Separation Between Fingers

Figure 2A:
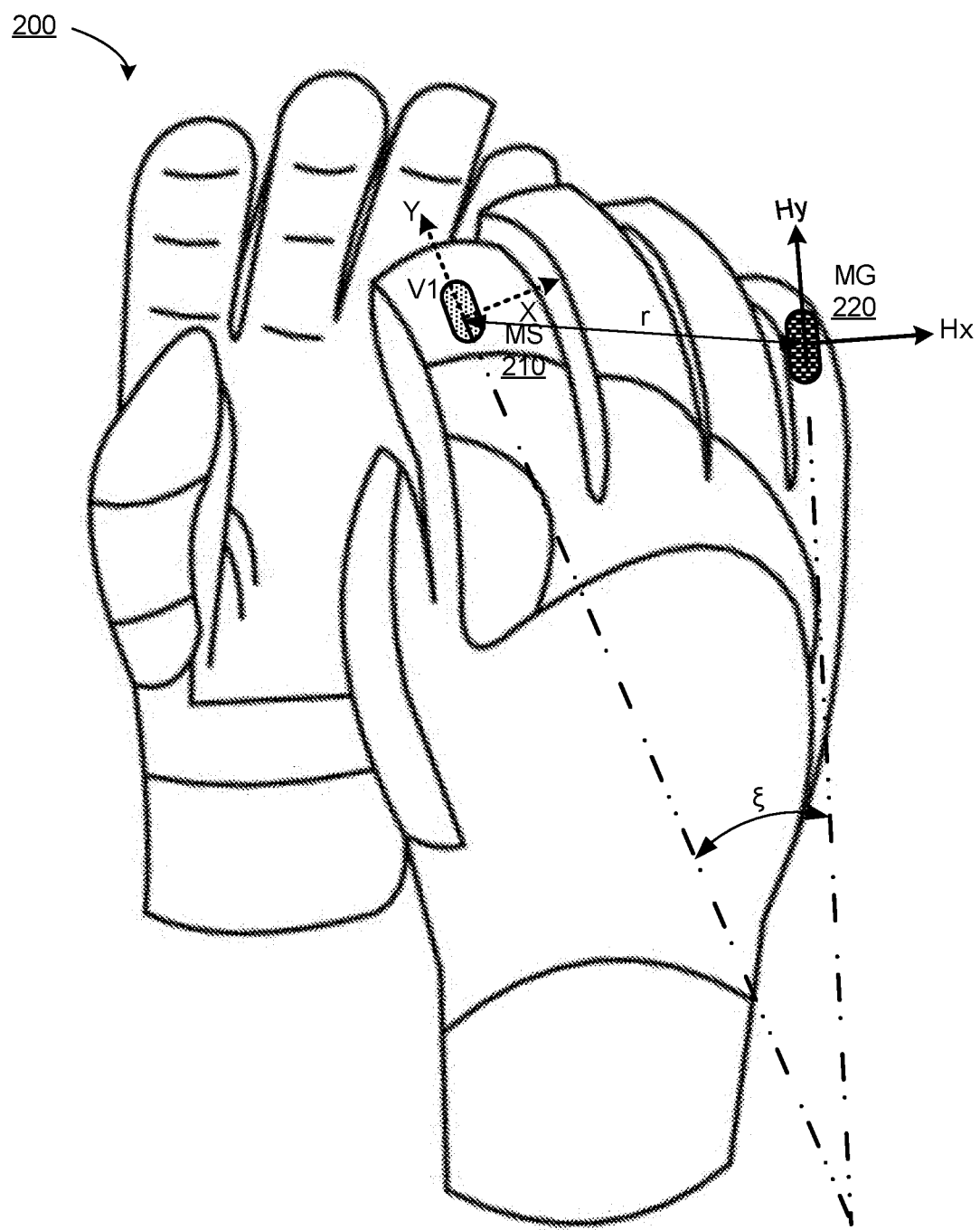
FIG. 2A illustrates positions of magnetic flux sensors and magnetic field generators on a wearable device, where a magnetic flux sensor positioned at a first finger and a magnetic generator coupled to a second finger can be used to determine an lateral angular (e.g., planar) separation between the first finger and the second finger, in accordance with one or more embodiments.
Figure 2B:
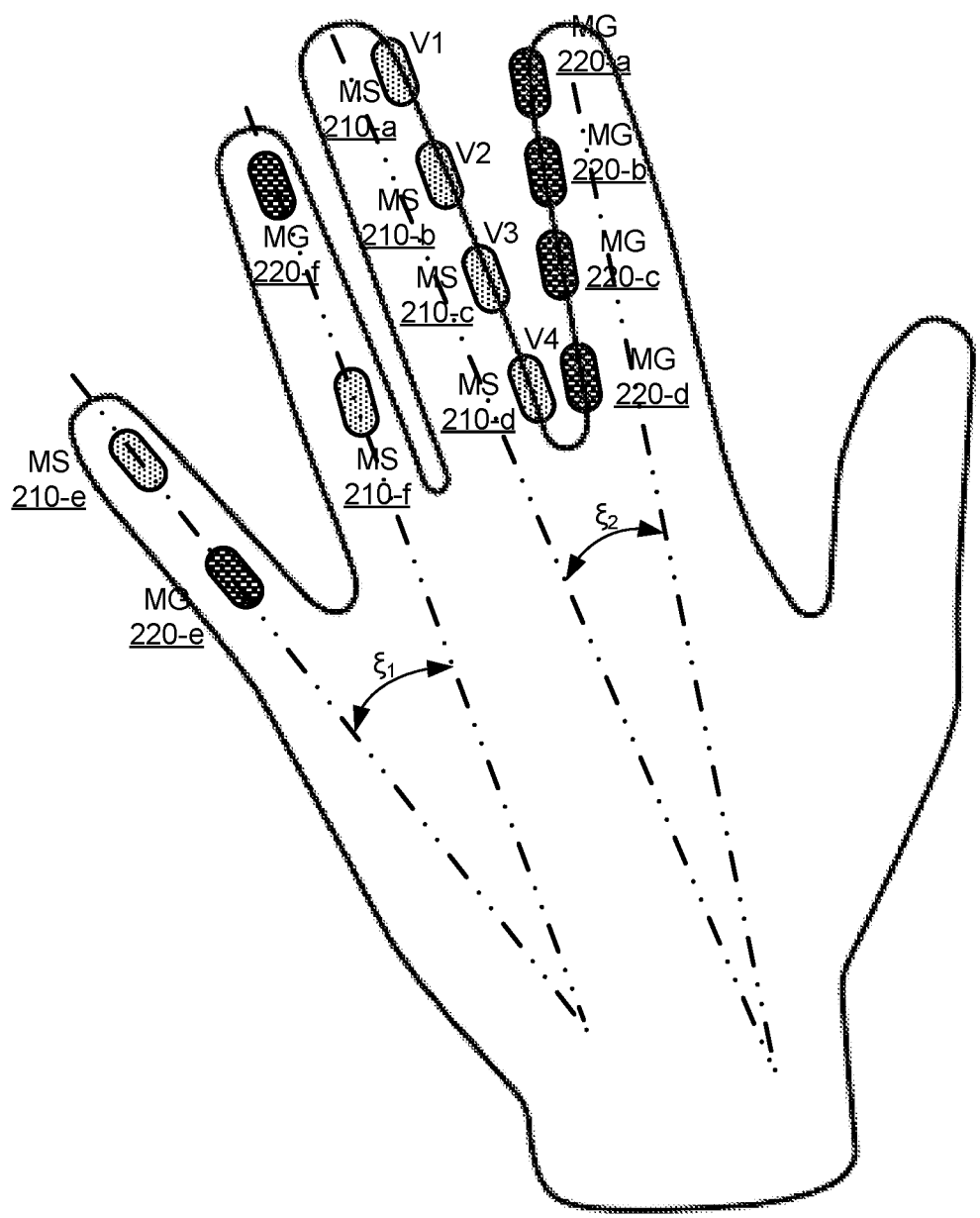
FIG. 2B illustrates positions of magnetic flux sensors and magnetic field generators on a wearable device, where magnetic flux sensors positioned at a first finger and magnetic generators coupled to a second finger can be used to determine an lateral angular (e.g., planar) separation between the first finger and the second finger, and where a magnetic flux sensor and a magnetic flux generator on a third finger and a magnetic flux sensor and a magnetic flux generator on a fourth finger can be used to determine an lateral angular (e.g., planar) separation between the third finger and the fourth finger, in accordance with one or more embodiments.

FIGS. 2A-2B illustrate positions of magnetic flux sensors (e.g., MS 210) and magnetic field generators (e.g., MG 220) positioned in a glove 200 in relation to fingers of a glove or a hand, and configured to determine a lateral angular separation (e.g., planar angle ξ) between the two fingers. The magnetic flux sensors and magnetic field generators illustrated in FIGS. 2A-2B may be provided within a wearable glove to be worn around the hand. As illustrated in FIG. 2A, a magnetic flux sensor (MS 210) is positioned at a first finger and a magnetic generator (MG 220) is positioned at a second finger. The signals detected by the magnetic flux sensor (MS 210), can be used to compute an angular lateral separation (e.g., planar angle ξ) between the first finger and the second finger based on the following equations, where $H_x$ and $H_y$ are magnetic field components at the generator and $H_{sx}$, $H_{sy}$ are components at the sensor, and $\alpha_n$ is an empirically derived constant of proportionality approximating the angle from the chord length r:

$$r = \sqrt[3]{\frac{H_x^2 + H_y^2}{H_{sx}^2 + H_{sy}^2}} \quad (13)$$

$$\xi \approx \alpha_n r \quad (14)$$

As illustrated in FIG. 2B, a plurality of magnetic flux sensors (including MS 210-*a*, MS 210-*b*, MS 210-*c*, MS 210-*d*, and so on) along a length of a finger, and a plurality of magnetic generators (e.g., MG 220-*a*, MG 220-*b*, MG 220-*c*, MG 220-*d*, and so on) are positioned along a length of another finger. The generators are phased in their drive, so that only a corresponding paired set of generators are driven for a given sensor at measurement time, so that a known source field strength and known axis r is approximately established, as discussed above. In such embodiments, the signals detected by the magnetic flux sensors (e.g., MS 210-*a*, MS 210-*b*, MS 210-*c*, MS 210-*d*) positioned along a first finger responsive to the magnetic flux generated by the magnetic generators (e.g., MG 220-*a*, MG 220-*b*, MG 220-*c*, MG 220-*d*, and so on) positioned along a second finger, are used in combination to determine an angular lateral separation (e.g., planar angle $\xi_2$) between the first finger and the second finger. Using a technique similar to that described above with reference to equations 13 and 14 may be used to calculate planar angle $\xi_2$. A system of equations is constructed, all relating to $\xi_2$. A method for solving over-determined systems like Least Squares may then be used to come up with an improved approximation of $\xi_2$:

Alternatively or in addition, a combination of both magnetic flux sensors (MS 210-*e*) and magnetic generators (MG 220-*e*) can be positioned along a first finger and a combination of magnetic flux sensors (MS 210-*f*) and magnetic generators (MG 220-*f*) can be positioned along a second finger. In such embodiments, the signals detected by the magnetic flux sensors (e.g., MS 210-*e*, MS 210-*f*) responsive to the magnetic flux generated respectively by the magnetic generators of the other finger (e.g., MG 220-*f*, MG 220-*e*), are used in combination to determine an angular lateral separation (e.g., planar angle $\xi_1$) between the first finger and the second finger. Calculation of planar angle $\xi_1$ using Hx and Hy (or, $H_r$ and $H_\theta$) from the multiple corresponding MGs may be determined using, e.g., the method described above (e.g., with reference to equations 13 and 14). In this embodiment, MG 220*f* and MG 222*e* are driven when MS 210*e* and MS 210*f* are sampled, respectively.

In some embodiments, and as explained with reference to FIGS. 1A-1E, each of the magnetic flux sensors (including MS 210 of FIG. 2A; and MS 210-*a*, MS 210-*b*, MS 210-*c*, MS 210-*d*, MS 210-*e*, MS 210-*f* of FIG. 2B) may include one or more sensing elements. For example, each magnetic flux sensor may include a plurality of sensing elements having predefined, known, or solvable relative positions as described with reference to sensing elements S1, S2, S3, and S4 of the coordinate system 130 of FIG. 1C. Alternatively, each magnetic flux sensor corresponds to an individual sensing element (e.g., magnetometers S1, S2, S3, and S4 of the coordinate system 130 of FIG. 1C) having a solvable or known spatial positions relative to other magnetic flux sensors.

In some embodiments, the magnetic generators (e.g., MG 220-*a*, MG 220-*b*, MG 220-*c*, MG 220-*d*, MG 220-*e*, MG 220-*f*, and so on) include each a single permanent magnet or electromagnet. In alternative embodiments, the magnetic generators include a plurality of permanent magnets having distinct (e.g., and known or solvable) relative spatial positions and/or different (e.g., and known or solvable) relative orientations. In alternative embodiments, one or more of the magnetic generators includes one or more programmable magnets (e.g., polymagnets) with programmable, controllable, and/or reconfigurable magnetic properties.

Furthermore, the magnetic fields generated by each of the electromagnets can be distinguished from magnetic fields generated by other electromagnets by controlling one or more attributes (e.g., frequency, timing, modulation codes/patterns) of the stimulating current provided to the electromagnet.

For example, each electromagnet can be stimulated at a different frequency for disambiguation (based on frequency division multiplexing) from other electromagnets. Accordingly, signals detected by the magnetic flux sensor (MS) can be uniquely associated with respective magnetic generators based on their respective frequencies. General techniques for modulation and demodulation can similarly be used.

Alternatively, each electromagnet can be stimulated at a different instance of time for disambiguation (e.g., time division multiplexing) from other electromagnets. Accordingly, signals detected by the magnetic sensor (MS) can be uniquely associated with respective magnetic generators based on a time duration at which the signals are detected.

Each magnetic flux sensor 210 (illustrated in FIG. 2B) outputs a signal (or combination of signals) responsive to the magnetic fields (Hx, Hy, Hz; or $H_r$ and $H_\theta$) generated by a MG, and detected at the respective magnetic flux sensor MS. The magnetic fields for the magnetic field generator MG 220 could be expressed as vector components ($H_r$ and $H_\theta$) as described with reference to FIGS. 1A-1B. Spatial position vectors V1, V2, and Vn are computed (as described with reference to FIGS. 1A-1E above) each corresponding to the signals output from the respective magnetic flux sensor.

The spatial vectors V1, V2, V3, and V4 represent positions of the magnetic generators with respect to each of the magnetic flux sensors. These vectors V1, V2, Vn are used to estimate the positions of the magnetic flux sensors in reference to the common the magnetic field generators. These positions are then used to compute the lateral angular separation (e.g., planar angle $\xi_1$ or $\xi_2$) between fingers. Angle $\xi_1$ or $\xi_2$ can be mathematically derived from the vectors V1, V2 using, e.g., the technique described above, except that in this case, frequency difference multiplexing (FDM) or time division multiplexing (TDM) is used to establish which generator contributed each contribution to the amplitude of the Hx and Hy, as opposed to just coordinating the measurements in time. This allows use of all the generators and all the sensors simultaneously.

Figure 2C:
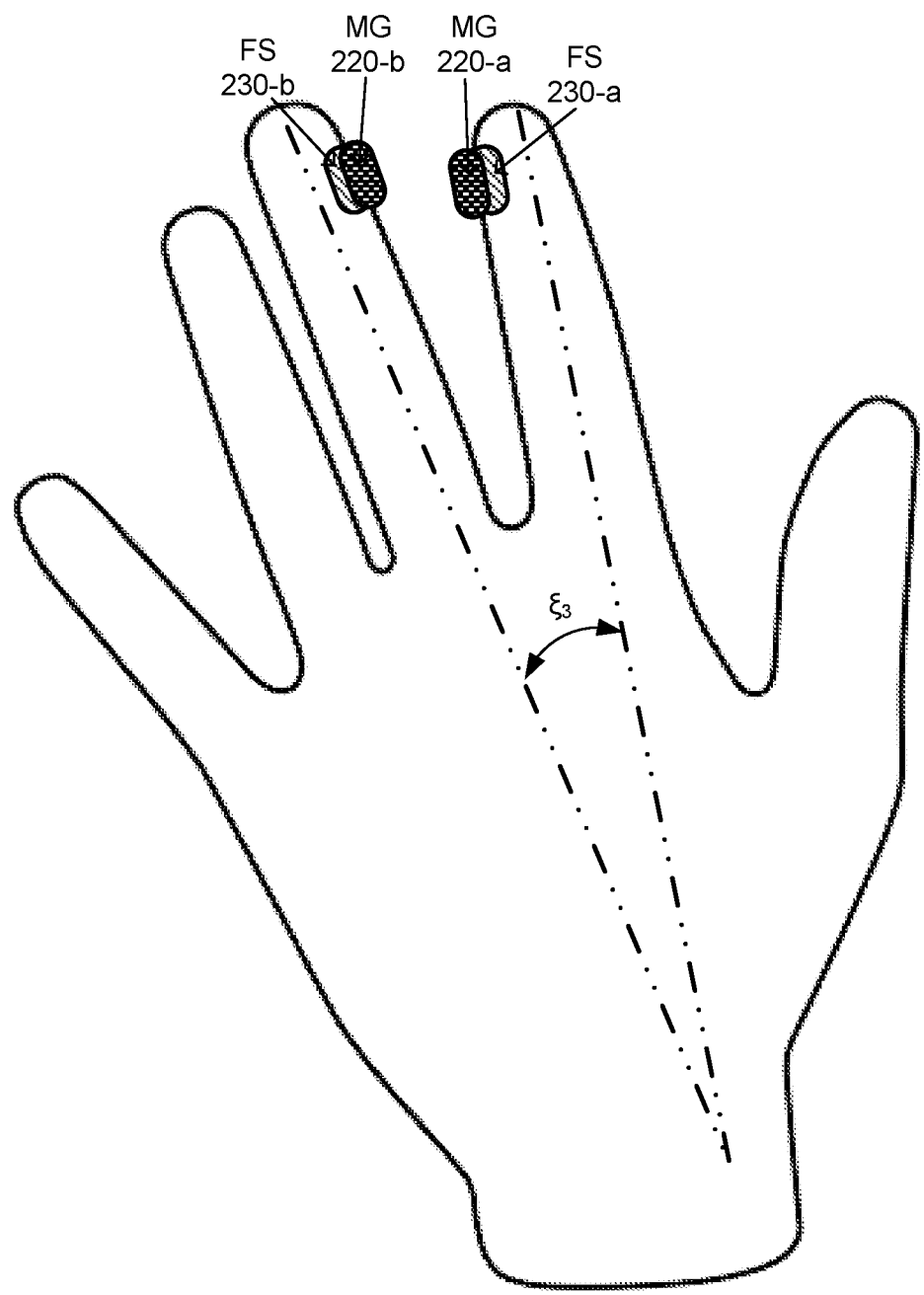
FIG. 2C illustrates positions of force sensors coupled to magnetic field generators in relation to fingers of a hand, and configured to determine a lateral separation (e.g., planar angle) between two fingers.

FIG. 2C illustrates positions of force sensors (e.g., FS 230 including FS 230-*a* and FS 230-*b*) physically coupled to magnetic field generators (e.g., MG 220 including MG 220-*a* and MG 220-*b*) in relation to fingers of a hand. The magnetic force of attraction or repulsion between the magnetic generators MG 220-*a* and MG 220-*b* is a function of the distance between the magnetic generators. This magnetic force of attraction or repulsion is measurable by the force sensors (FS 230-*a* and FS 230-*b* and configured to determine a lateral separation (e.g., angle $\xi_3$) between the two fingers.

In some embodiments, the magnetic generators MG 220-*a* and MG 220-*b* have like polarity (e.g., both MG 220-*a* and MG 220-*b* are North poles; or both magnetic generators MG 220-*a* and MG 220-*b* are South poles). In such embodiments, force sensors FS 230-*a* and FS 230-*b* are configured to detect and sense a force of repulsion between the MG 220-*a* and MG 220-*b*, which is a function of the separation or spatial distance between the two magnetic generators.

Alternatively, the magnetic generators MG 220-*a* and MG 220-*b* have opposite polarity (e.g., MG 220-*a* is a North pole and MG 220-*b* is a South pole). In such embodiments, force sensors FS 230-*a* and FS 230-*b* are configured to detect and sense a force of attraction between the MG 220-*a* and MG 220-*b*, which is a function of the separation or spatial distance between the two magnetic generators.

In either case, the measured magnetic force (of attraction or repulsion) is then used to compute the lateral angular separation (e.g., planar angle $\xi_3$) between fingers, as follows:

$$r = \sqrt[3]{\frac{\mu_0 \mu_r \|H\|^2 A}{2\|F\|}} \quad (15)$$

$$\xi \approx \alpha_n r \quad (16)$$

Where r is the length of the approximated chord formed by the distance between the magnet faces, $\mu_0$ is the permeability of free space, $\mu_r$ is the relative permeability of the medium of propagation of the magnetic field, H is the magnetizing field of the magnets, and A is the area of the surfaces projected onto the other, and F is the observed force vector.

Determination of Transverse (e.g., Oblique) Separation Between Fingers

Figure 3A:
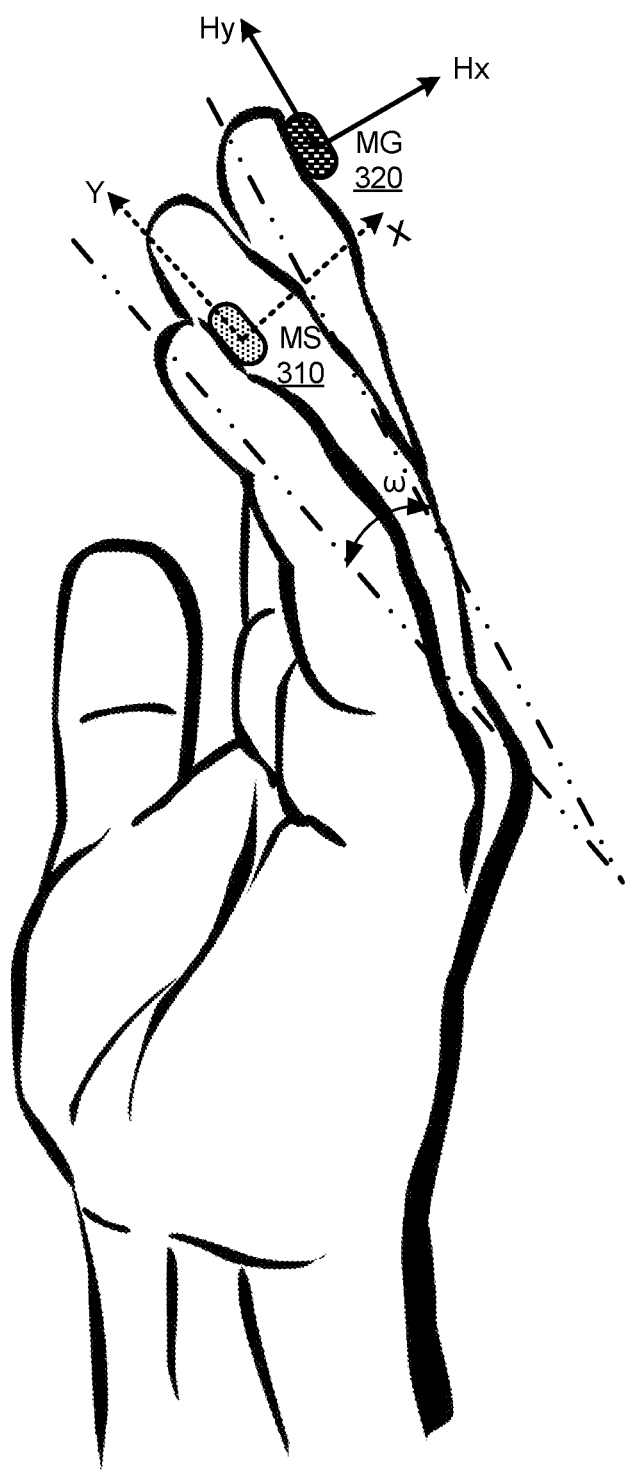
FIG. 3A illustrate positions of magnetic flux sensors and magnetic field generators in relation to a hand, where a magnetic flux sensor positioned at a first finger and a magnetic generator coupled to a second finger can be used to determine an transverse angular (e.g., oblique) separation between the first finger and the second finger, in accordance with one or more embodiments.
Figure 3B:
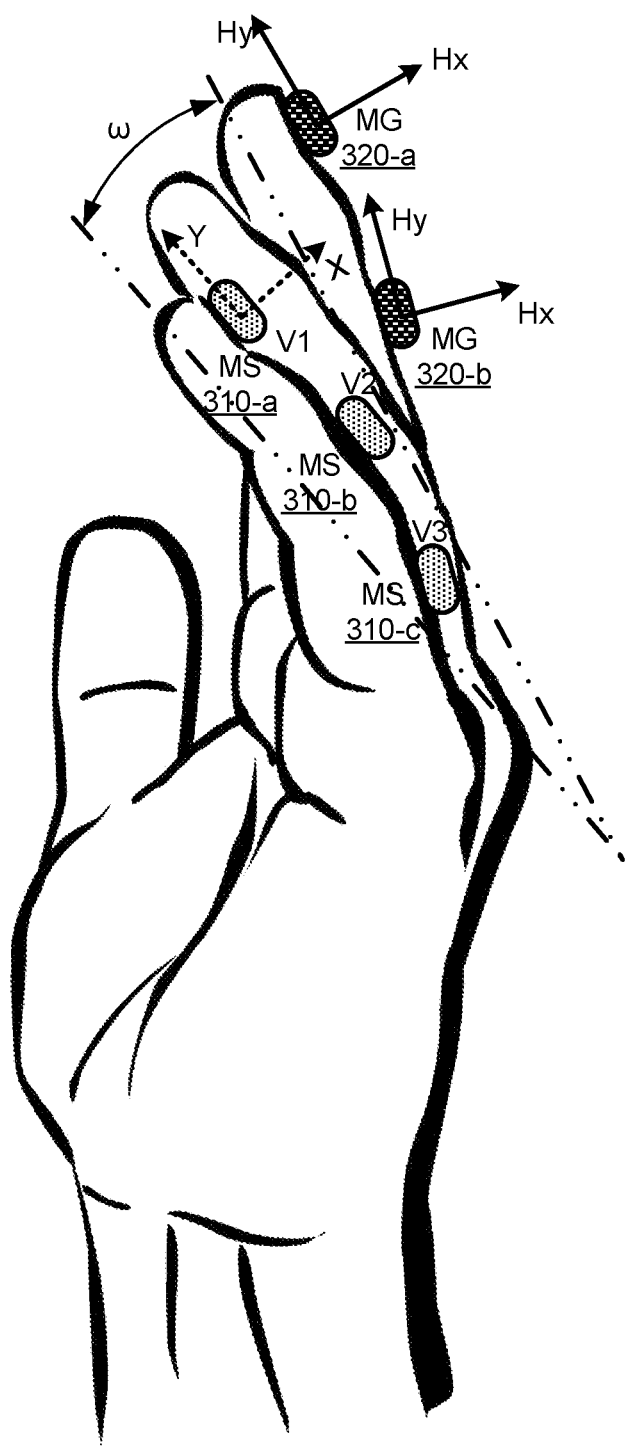
FIG. 3B illustrate positions of multiple magnetic flux sensors and multiple magnetic field generators in relation to a hand, where multiple magnetic flux sensors positioned at a first finger and multiple magnetic generators coupled to a second finger can be used to determine an transverse angular (e.g., oblique) separation between the first finger and the second finger, in accordance with one or more embodiments.
Figures 4A, 4B, 4C, 4D:
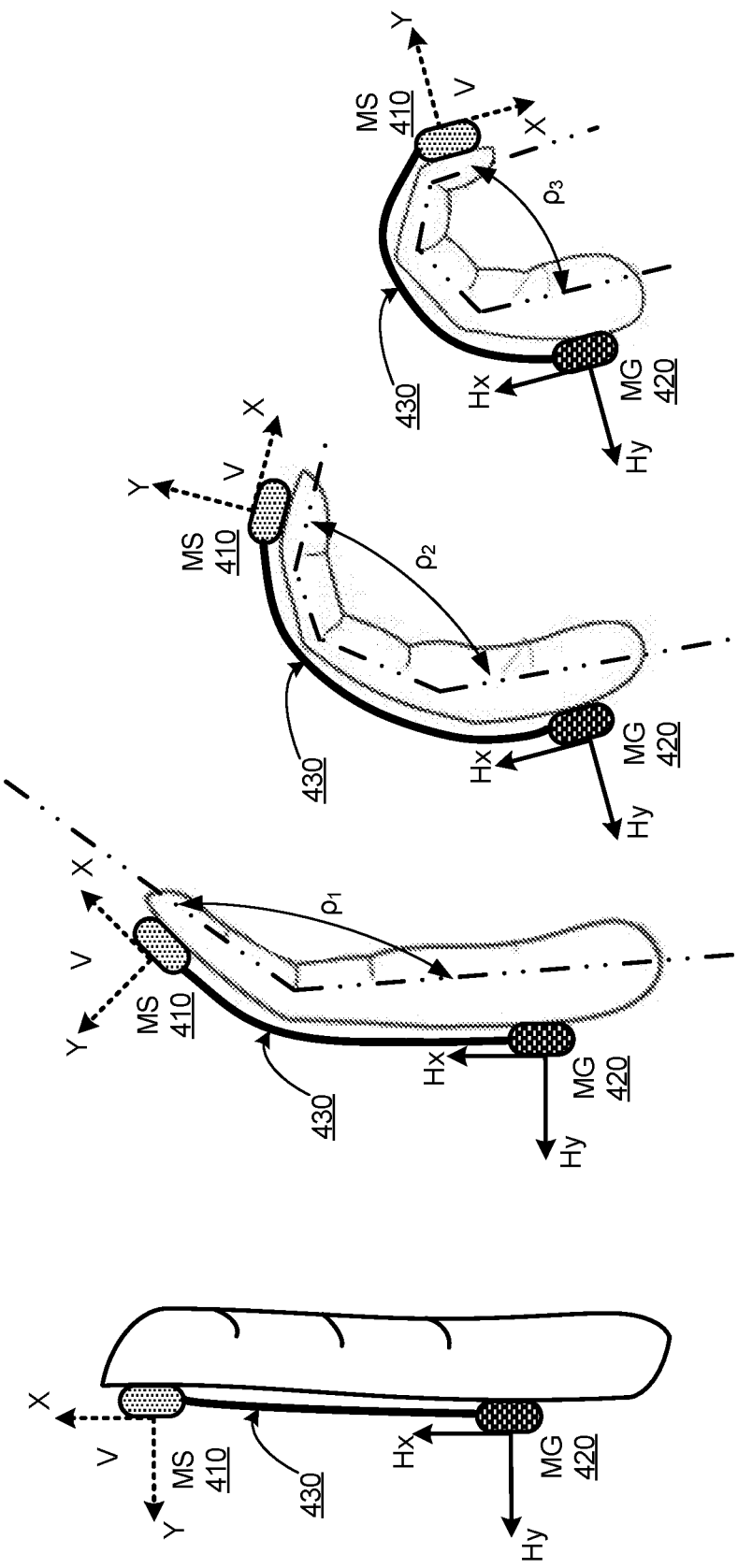
FIG. 4A illustrates a position of magnetic flux sensors and magnetic field generators along a finger, configured to determine bend angles of the finger, in accordance with one or more embodiments.
FIG. 4B illustrates a position of magnetic flux sensors and magnetic field generators along a finger, configured to determine bend angles of the finger, in accordance with one or more embodiments.
FIG. 4C illustrates positions of magnetic flux sensors and magnetic field generators along a finger, configured to determine bend angles of the finger, in accordance with one or more embodiments.
FIG. 4D illustrates positions of magnetic flux sensors and magnetic field generators along a finger, configured to determine bend angles of the finger, in accordance with one or more embodiments.

FIGS. 3A-3B illustrate positions of magnetic flux sensors and magnetic field generators in relation to a hand. As illustrated in FIG. 3A, one or more magnetic flux sensors (MS310) positioned at a first finger and one or more magnetic generators (MG 320) is coupled to a second finger. Signals detected by the magnetic flux sensor responsive to the magnetic fields generated by the magnetic generators can be used to determine a transverse angular separation (e.g., oblique angle ω) between the first finger and the second finger, in accordance with one or more embodiments. The magnetic flux sensors and magnetic field generators illustrated in FIGS. 3A-3B may be provided within a wearable glove to be worn around the hand (e.g., within glove 200 illustrated in FIG. 2A).

In some embodiments, and as explained with reference to FIGS. 1A-1E, the magnetic flux sensor (MS 310 of FIG. 3A; and MS 310-*a*, 310-*b*, and 310-*c* of FIG. 3B) may include one or more sensing elements. For example, these magnetic flux sensors may include a plurality of sensing elements having predefined, known, or solvable relative positions as described with reference to sensing elements S1, S2, S3, and S4 of the coordinate system 130 of FIG. 1C.

In some embodiments, each of the magnetic generators (including MG 320-*a*, MG 320-*b*) includes a single permanent magnet or electromagnet. In alternative embodiments, a single magnetic generator includes a plurality of permanent magnets having distinct (e.g., and known or solvable) relative spatial positions and/or different (e.g., and known or solvable) relative orientations. In alternative embodiments, a single magnetic generator includes one or more programmable magnets (e.g., polymagnets) with programmable, controllable, and/or reconfigurable magnetic properties.

As illustrated in FIG. 3B, a plurality of magnetic flux sensors (e.g., MS 310-*a*, 310-*b*, and 310-*c* of FIG. 3B) are positioned along a length of a first finger and a plurality of magnetic field generators (including MG 320-*a*, 320-*b*, and so on) are placed on another finger. In such embodiments, the signals detected by the magnetic flux sensors (e.g., MS 310-*a*, MS 310-*b*, MS 310-*c*) positioned along a first finger responsive to the magnetic flux generated by the magnetic generators (e.g., MG 320-*a*, MG 320-*b*) positioned along a second finger, are used in combination, to determine a transverse angular separation (e.g., oblique angle ω) between the first finger and the second finger. Given the constraints, a direction solution for calculation of oblique angle ω using Hx and Hy (or, $H_r$ and $H_\theta$) from the various MG is not possible. Instead, an empirical mapping is created, observing omega using another technique, controlling Hy and Hx at the MGs, and logging it with the observed x and y H data from MS 310*a*, 310*b* and 310*c*. A surface can be fit for different MG strengths expressing omega as a function of V1, V2, and V3. Future values of V1, V2, and V3 can then be indexed to the surface to predict omega.

In some embodiments, each magnetic field generator (including MG 320-*a*, 320-*b*, and so on) includes one or more electromagnets that can be independently actuated based on current provided through a current carrying coil to generate corresponding magnetic fields. The magnetic fields for each of the magnetic field generators (including MG 320-*a*, 320-*b*, and so on) could be expressed as vector components ($H_r$ and $H_\theta$) as described with reference to FIGS. 1A-1B.

Furthermore, the magnetic fields generated by each of the electromagnets can be distinguished from magnetic fields generated by other electromagnets by controlling one or more attributes (e.g., frequency, timing, modulation codes/patterns) of the stimulating current provided to the electromagnet.

For example, each electromagnet can be stimulated at a different frequency for disambiguation (based on frequency division multiplexing) from other electromagnets. Accordingly, signals detected by the magnetic flux sensor (MS) can be uniquely associated with respective magnetic generators based on their respective frequencies.

Alternatively, each electromagnet can be stimulated at a different instance of time for disambiguation (e.g., time division multiplexing) from other electromagnets. Accordingly, signals detected by the magnetic sensor (MS) can be uniquely associated with respective magnetic generators based on a time duration at which the signals are detected.

As illustrated in FIG. 3B, a plurality of magnetic field generators (including MG 320-*a*, 320-*b*, and so on) are positioned along a length of a first finger and a plurality of magnetic flux sensors (including MS 310-*a*, 310-*b*, and so on) along a length of a second finger. The magnetic sensors output signals (e.g., combination of signals) responsive to magnetic fields generated by each MG, and which are detected at the magnetic flux sensor. Spatial position vectors V1, V2, and V3 are computed (as described with reference to FIG. 1A-1B above), each vector corresponding to a respective signal output from the magnetic flux sensor responsive to a respective magnetic field generator.

The spatial vectors V1, V2, and V3, are used to determine the angular separation (e.g., oblique angle ω) between the first finger and the second finger. The technique described above may be used to calculate of oblique angle ω based on the vectors V, in the case of multiple generators and multiple sensors tracking each other.

Determination of Bend Angle of a Finger

FIGS. 4A-4D illustrate positions of one or more magnetic flux sensors (MS 410) and magnetic field generators (MG 420) along a finger, configured to be used to determine a bend angle of the finger, in accordance with one or more embodiments.

As illustrated in FIGS. 4A-4D, the relative orientation and positions (separation or distances) of MS 410 and MG 420 vary as a function of a bend angle (ρ) of the finger.

The magnetic flux sensor MS 410 outputs signals (or a combination of signal components) responsive to a magnetic field generated by the MG 420, and which is detected at the magnetic flux sensor MS410. A spatial position vector V is optionally computed (as described with reference to FIG. 1A-1B above), indicative of a relative position of the magnetic flux sensor 410 in relation to the magnetic field generator MG 420. The spatial position vector (V) optionally includes Cartesian distances (x, y) and angular orientations (α, φ), that can be computed based on the signals detected by the MS 410 responsive to the magnetic field components (Hx and Hy; or $H_r$ and $H_θ$) generated by MG 420.

In some embodiments, a bend angle (e.g., $ρ_1$, $ρ_2$, $ρ_3$) of the finger is computed based on the measured flux responsive to the magnetic field components Hx and Hy (or, $H_r$ and $H_θ$). For example, the bend angle of the finger is computed based on the components (Cartesian distances (x, y) and angular orientations (α, φ) of vector V. The bend angle ρ based on vector V may be determined using one or more techniques discussed above, but modified such that a point cloud for V versus ρ for given Hx Hy from MG.

In one or more embodiments, a flexible member 430 is positioned between the magnetic flux sensor (MS 410) and the magnetic field generator (MG 420). The flexible member is optionally configured to be a material that modifies, redirects, focuses, or otherwise interferes with the magnetic field magnetic field components (Hx and Hy; or $H_r$ and $H_θ$) generated by MG 420. Member 430 may be comprised of, e.g., soft magnetic alloy foils, such as those of the nickel-iron type, or ferrite impregnated polymer sheets. In some embodiments, the flexible member 430 is a strain gauge element; a measure of flex and/or bend deformation of the strain gauge element is optionally used, in addition to the measured flux in order to determine the bend angle (ρ) of the finger. In some embodiments, the bend angle (ρ) of the finger is computed based on the deformation of the strain gauge. The strain in the system can be estimated by modeling the strain gauge as an Euler-Bernoulli beam in simple bending, because the foam substrate and bending stiffness are several orders of magnitude less than the tensile stiffness of the gauge substrate. In simple bending, the strain(ε) at the surface of the beam is given as the ratio of the distance from the neutral bending axis (z) and the radius of curvature (ρ) of the beam—for strain at the surface of thin beams, z can be approximated as half of the total beam thickness:

$$\varepsilon = -\frac{z}{\rho} = -\frac{t/2}{\rho} \quad (17)$$

The bending strain and thus the radius of curvature in the strain gauge can be related to the voltage output, gauge factor, and excitation:

$$\frac{V_o}{V_{EX}} = -\frac{GF \cdot \varepsilon}{4}\left(\frac{1}{1 + GF \cdot \frac{\varepsilon}{2}}\right) = \frac{GF \cdot t}{8\rho}\left(\frac{1}{1 - GF \cdot \frac{t}{4\rho}}\right) \quad (18)$$

Sensing System

Figure 5:
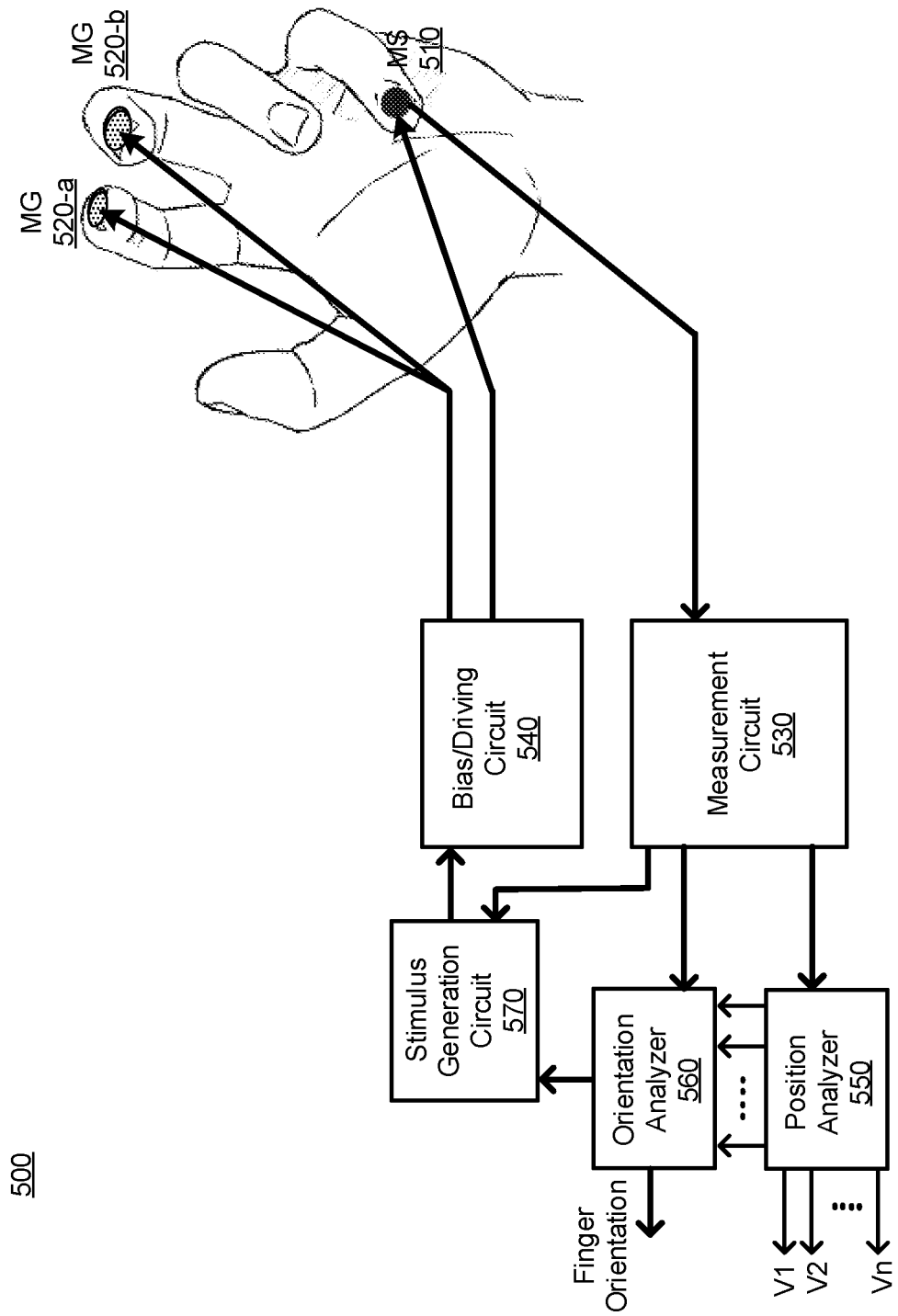
FIG. 5 illustrates a system for position and orientation sensing, according to one or more embodiments.

FIG. 5 illustrates a system 500 for position and location sensing, according to one or more embodiment.

The system 500 includes one or more sensors (including the magnetic flux sensor(s) MS 510) as well as one or more magnetic field generators (including MG 520-a and 520-b) as described with reference to FIGS. 2-4. In one or more embodiments, system 500 also includes a bias/driving circuit 540 for providing bias signals (such as power and other operating signals) and driving signals (such as stimulating/driving currents and voltages) to the sensors and magnetic field generators. The driving signals provided to each of the magnetic generators may be disambiguated from the corresponding driving signals provided to other magnetic generators based on attributes such as frequency, timing, modulation codes, modulation patterns, and so on. The measurement circuit 530 detects and selects signals from the sensors 510 and optionally preconditions (e.g., filters, amplifies, denoises) the detected signals. The sensor can have a sensing element which is resonant to certain frequencies and may be tuned to respond to those frequencies. In such embodiments, the measurement circuit 530 optionally includes bandpass filters centered at corresponding frequencies, to extract and differentiate the magnetic fields from individual electromagnet. In one implementation, the bandpass filters are 6th-order FIR (finite impulse response) filters with the 3 dB cutoff at +2 and −2 Hz from the center frequency. If the data rate is 320 samples/second, the usable bandwidth is about 160 Hz, within which the electromagnets may be operated at 70 Hz, 85 Hz, 100 Hz, 115 Hz and 125 Hz. For different sample frequencies, different channel frequencies can be assigned each with more individual bandwidth. In addition, a magnetometer may have a demodulator in hardware which would allow for them to detect much higher frequencies even with a low sample rate front end, with a corresponding modulator on the generator side.

The measurement circuit 530 optionally includes an analog demodulator and selection filter which serves to convert the detected signal to a baseband (frequency range having signal content of interest). Additionally, the measurement circuit 530 may include a digital signal processor to digitally filter the detected or baseband-converted signal to further select frequency components of interest. The position analyzer 550 generates spatial position vectors (V1, V2, Vn, and the like), corresponding to each MS-MG pair, representing relative positions of the magnetic field generators (MG 520-a, MG 420-b, and the like) with reference to the magnetic flux sensor (MS 510). The orientation analyzer 560 determines a finger orientation based on the signals measured from the sensors 510 and, optionally, the spatial position vectors (V1, V2, Vn, and the like).

In one or more embodiments, system 500 also includes a stimulus generation circuit 570 which generates signals to modify biasing and driving properties of the sensors 510 and generators 520 based on the measured or detected signals. The stimulus generation circuit 570 may receive signals from the orientation and position analyzers 560 and 550, or from the measurement circuit 530 and modify properties of the magnetic field generated by the generators 520 based on the received signals.

In one embodiment, the measurement circuit 530 and the position analyzer 550 may be referred to as a controller. The controller may optionally include one or more of the bias/driving circuit 540, the stimulus generation circuit 570, the orientation analyzer 560, and the position analyzer 550.

FIG. 6 is a flow chart of an example process 600 for sensing position and orientation of a wearable device based on magnetic fields, according to one or more embodiment. The process 600 of FIG. 6 may be performed by a system 500 for position and orientation sensing. Other entities (e.g., wearable device) may perform some or all of the steps of the process in other embodiments. Likewise, embodiments may include different and/or additional steps, or perform the steps in different orders.

One or more magnetic fields are generated via one or more magnetic field generators positioned on the wearable device. Responsive to the generated magnetic fields (e.g., applied magnetic fields), sensor signals corresponding to one or more sensor-generator pairs located on a wearable device are measured 610 using one or more magnetic flux sensors. Spatial vectors representing relative positions and/or orientations for each sensor-generator pair are determined 620 based on the measured sensor signals. Relative positions for portions of the wearable device (e.g., bend angle of joint, angular separation between fingers, or fingertip positions of a wearable glove) are determined 630 based on the spatial vectors.

In some embodiments, and as described with reference to FIGS. 1A-1C, the spatial localization algorithm comprises:

(1) Sensing/measuring (and optionally storing) the magnetic vector H from magnetic flux sensors, for one or more of the magnetic generators.

(2) For each axis in H (e.g., for each component of the magnetic field vector H such as Hx, Hy, Hz; or $H_r$ and $H_\theta$), applying a bandpass filter to extract magnetic fields emitted from individual electromagnets and, optionally, extracting envelopes of filtered data using the Hilbert transform.

(3) Calculating the total magnetic field strength (e.g., as the norm-2 of H (using eq. 3)).

(4) Performing a coordinate transform to a Cartesian coordinate space (e.g., to express the components of the magnetic field vector H as functions of 3D Cartesian variables (x, y, z)) to obtain a new set of equations expressing the measured components of the magnetic field vector H in terms of (as functions of) the 3D Cartesian variables. In some embodiments, performing the coordinate transform comprises substituting variables of a radial coordinate system (e.g., the two variables r and θ in Eq. 3) with 3D Cartesian coordinate system variables (x, y, z). In some embodiments, the coordinate transform is performed using Eqs. 4 to 11.

(5) Computing the electromagnet's 3D position in terms of the 3D Cartesian coordinate system variables (x, y, z) by solving the new set of equations expressing the measured components of the magnetic field vector H in terms of (as functions of) the 3D Cartesian variables.

In one or more embodiments, additional signals are detected and measured using additional sensors (such as force sensors illustrated in FIG. 2C, or strain gauge elements described with reference to FIGS. 4A-4D). Relative positions of portions of the wearable device (e.g., of a hand wearing the glove) are optionally determined using the additional signals. Relative positions of portions of the wearable device (e.g., relative locations of the fingers on a glove) based on the position vectors.

The relative locations of portions of the wearable device are used to determine orientations of portions of the wearable device. For example, spatial separation between parts of a finger (determined based on the position vectors) is used to compute an angular separation (e.g., planar angle as illustrated in FIGS. 2A-2C, or transverse/oblique angle as illustrated in FIGS. 3A-3B) between fingers, or to determine a bend angle of an individual finger (As illustrated in FIGS. 4A-4D).

In one or more embodiments, the disclosed approaches (e.g., the systems and methods for position and orientation sensing (e.g., sensing bend angles and angular separations) are used in conjunction with a virtual reality (VR) system. For example, the disclosed approaches for detecting bend angles and angular separation of fingers or other body parts are used to provide information about or to render a state of the hand (or other body part) in a VR environment or VR world. For example, states of a hand (e.g., open, closed, pointing, gesturing, etc.) can be determined based on the detected orientations of fingers of the hand.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Additional Configuration Information

The figures depict various embodiments of the present invention for purposes of illustration only. One skilled in the art will readily recognize from the following discussion that alternative embodiments of the structures and methods illustrated herein may be employed without departing from the principles of the invention described herein.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A wearable device comprising:
    a plurality of magnetic field generators coupled to the wearable device, wherein the wearable device is configured to be worn on a body part of a user;
    a corresponding one or more magnetic field sensors coupled to the wearable device; and
    a controller configured to:
        instruct each magnetic field generator to generate a magnetic field at a different frequency from other magnetic field generators,
        instruct each corresponding magnetic field sensor to measure one or more sensor signals, and
        determine spatial vectors representing relative position for each magnetic field generator and each corresponding magnetic field sensor based on the one or more sensor signals.

2. The wearable device of claim 1, wherein at least one magnetic field sensor comprises a plurality of sensing elements with known or solved positions relative to one another.

3. The wearable device of claim 2, wherein the magnetic field sensor comprises four sensing elements.

4. The wearable device of claim 1, wherein the wearable device is a glove.

5. The wearable device of claim 4, wherein at least one magnetic field generator is coupled to a known position on a first finger and at least one corresponding magnetic field sensor is coupled to a known position on a second finger, and the controller is further configured to determine a lateral angular separation between the first finger and the second finger based on the spatial vectors.

6. The wearable device of claim 4, wherein at least one magnetic field generator is coupled to a first known position on a finger and at least one corresponding magnetic field sensor is coupled to a second known position on the finger, and the controller is further configured to determine a bend angle of the finger based on the spatial vectors.

7. The wearable device of claim 1, wherein at least one magnetic field generator generates a magnetic field that propagates to at least one corresponding magnetic field sensor through an ambient environment.

8. The wearable device of claim 1, wherein at least one magnetic field generator generates a magnetic field that propagates to at least one corresponding magnetic field sensor through a controlled medium.

9. The wearable device of claim 1, wherein at least one magnetic field generator comprises a plurality of generating elements.

10. The wearable device of claim 1, further comprising one or more sensing elements including at least one of a Hall effect sensor, a ferromagnetic lensing sensor, and a force sensor.

11. The wearable device of claim 10, wherein the one or more sensing elements is configured to calibrate data from the one or more magnetic field sensors.

12. A method comprising:
    generating, by each magnetic field generator of a plurality of magnetic field generators, a magnetic field at a different frequency from other magnetic field generators, wherein the magnetic field generators are coupled to a wearable device and the wearable device is configured to be worn on a body part of a user;
    measuring, by one or more corresponding magnetic field sensors coupled to the wearable device, one or more sensor signals; and
    determining, by a controller, spatial vectors representing relative position for each magnetic field generator and each corresponding magnetic field sensor based on the one or more sensor signals.

13. The method of claim 12, wherein at least one magnetic field sensor comprises a plurality of sensing elements with known or solved positions relative to one another.

14. The method of claim 12, wherein the wearable device is a glove.

15. The method of claim 14, wherein at least one magnetic field generator is coupled to a known position on a first finger and at least one corresponding magnetic field sensor is coupled to a known position on a second finger, and the method further comprises determining a lateral angular separation between the first finger and the second finger based on the spatial vectors.

16. The method of claim 14, wherein at least one magnetic field generator is coupled to a first known position on a finger and at least one corresponding magnetic field sensor is coupled to a second known position on the finger, and the method further comprises determining a bend angle of the finger based on the spatial vectors.

17. The method of claim 12, wherein at least one magnetic field generator generates a magnetic field that propagates to at least one corresponding magnetic field sensor through an ambient environment.

18. The method of claim 12, wherein at least one magnetic field generator generates a magnetic field that propagates to at least one corresponding magnetic field sensor through a controlled medium.

19. The method of claim 12, wherein at least one magnetic field generator comprises a plurality of generating elements.

20. The method of claim 12, further comprising one or more sensing elements including at least one of a Hall effect sensor, a ferromagnetic lensing sensor, and a force sensor and the method further comprises calibrating data from the one or more magnetic field sensors with the one or more sensing elements.

* * * * *